US009996245B2

(12) United States Patent
Lawrence et al.

(10) Patent No.: US 9,996,245 B2
(45) Date of Patent: *Jun. 12, 2018

(54) GRAPHICAL USER INTERFACE CONTROL FOR SCROLLING CONTENT

(71) Applicant: International Business Machines Corporation, Armonk, NY (US)

(72) Inventors: Leah A. Lawrence, Austin, TX (US); Richard W. Ragan, Jr., Round Rock, TX (US); Yue Yuan, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/933,379

(22) Filed: Nov. 5, 2015

(65) Prior Publication Data

US 2016/0054913 A1 Feb. 25, 2016

Related U.S. Application Data

(63) Continuation of application No. 13/790,806, filed on Mar. 8, 2013, now Pat. No. 9,268,475.

(51) Int. Cl.
*G06F 3/048* (2013.01)
*G06F 3/0485* (2013.01)

(52) U.S. Cl.
CPC ................. *G06F 3/04855* (2013.01)

(58) Field of Classification Search
None
See application file for complete search history.

(56) References Cited

U.S. PATENT DOCUMENTS 5,506,951 A 4/1996 Ishikawa
5,864,330 A 1/1999 Haynes
(Continued)

FOREIGN PATENT DOCUMENTS

| CN | 1224195 A | 7/1999 |
| CN | 1346457 A | 4/2002 |
| CN | 1670680 A | 9/2005 |
| CN | 101796477 A | 8/2010 |

OTHER PUBLICATIONS

Thomas, "Lion Tip: Change the Mouse Scrolling Direction", http://www.themacuniverse.com/2011/07/28/lion-tip-change-the-mouse-scrolling-direction/, Jul. 28, 2011, 6 pages.
(Continued)

*Primary Examiner* — William C Trapanese
(74) *Attorney, Agent, or Firm* — Maeve L. McCarthy; Hoffman Warnick LLC

(57) ABSTRACT

A solution for managing a graphical user interface including a panel area is provided. Content included in the graphical user interface can be generated for presentation to a user. The generating can include determining the content to be displayed using the panel area cannot be displayed completely within the panel area using a set of display settings. In response, data corresponding to a visible portion of the content can be added for display in the panel area and a graphical user interface scroll control can be provided for the panel area. The graphical user interface scroll control can enable a user to adjust the portion of the content displayed in the panel area in a first direction by manipulating the graphical user interface scroll control in the first direction.

20 Claims, 7 Drawing Sheets

(56) References Cited

U.S. PATENT DOCUMENTS

| | | |
|---|---|---|
| 5,874,957 A | 2/1999 | Cline et al. |
| 5,923,861 A | 7/1999 | Bertram et al. |
| 6,507,349 B1 | 1/2003 | Balassanian |
| 6,683,627 B1 | 1/2004 | Ullmann et al. |
| 7,202,857 B2 | 4/2007 | Hinckley et al. |
| 7,461,355 B2 | 12/2008 | SanGiovanni |
| 8,127,245 B2 | 2/2012 | Riss et al. |
| 2004/0119753 A1 | 6/2004 | Zencke |
| 2007/0157112 A1 | 7/2007 | Peters |
| 2007/0236475 A1* | 10/2007 | Wherry ............ G06F 3/0485 345/173 |
| 2008/0189657 A1 | 8/2008 | Kim |
| 2009/0070707 A1 | 3/2009 | Schaller et al. |
| 2012/0011465 A1 | 1/2012 | Rezende |

OTHER PUBLICATIONS

"Fit and Finish: Insight from the Ironworks User Experience Group", http://fitandfinish.ironworks.com/2011/07/scrollbars-and-swipe-gestures-in-mac-os-x-lion.html, Jul. 21, 2011, 3 pages.
Cipriani, "How to change Lion's scroll direction", http://howto.cnet.com/8301-11310_39-20081421-285/how-to-change-lions-scroll-direction/, Jul. 22, 2011, 3 pages.
Office Action for U.S. Appl. No. 13/790,806, dated May 22, 2015, 16 pages.
Notice of Allowance and Fee(s) Due for U.S. Appl. No. 13/790,806, dated Sep. 25, 2015, 5 pages.

\* cited by examiner

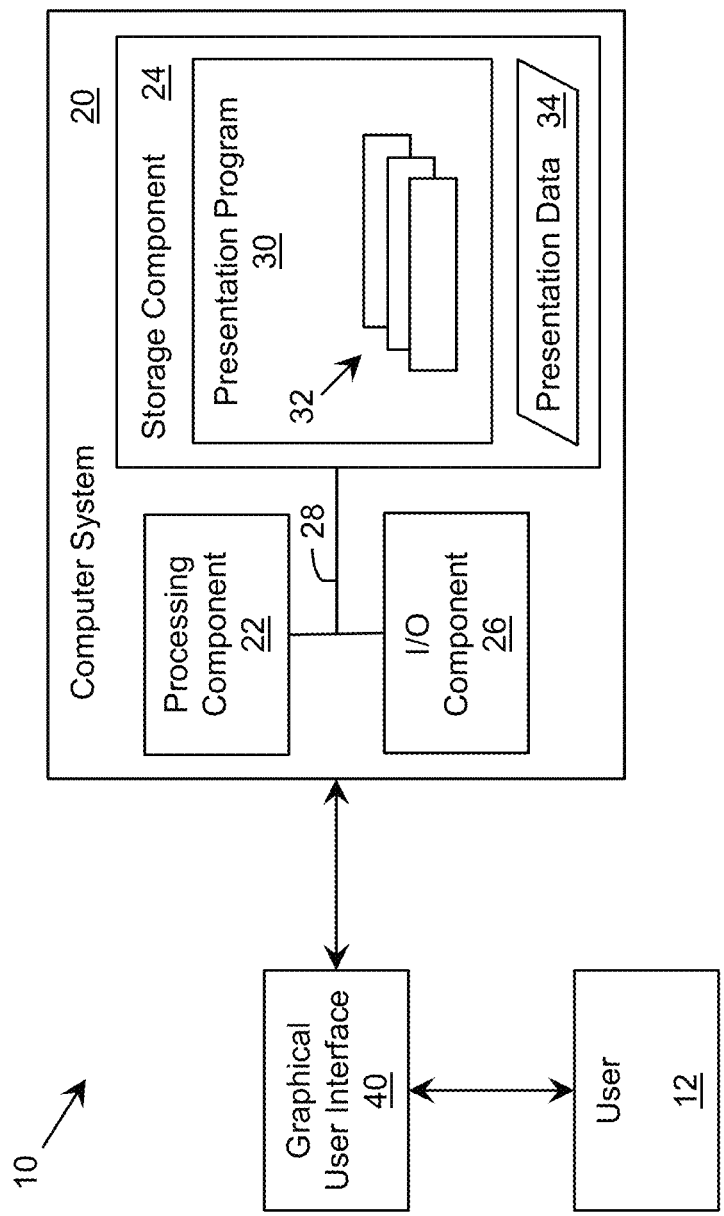

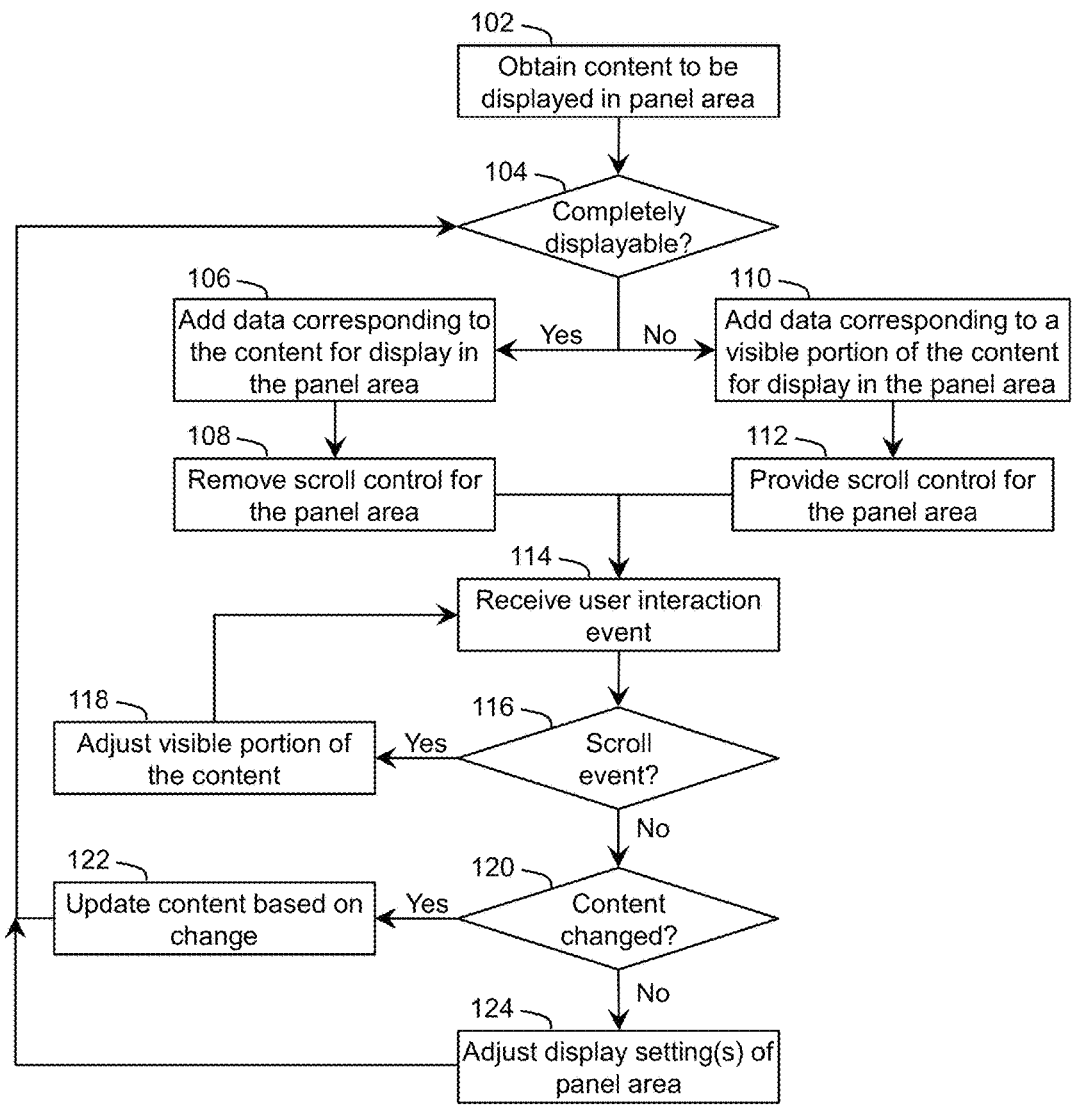

GRAPHICAL USER INTERFACE CONTROL FOR SCROLLING CONTENT

TECHNICAL FIELD

The present invention relates generally to graphical user interfaces, and more particularly, to a user interface control for scrolling a panel area of a graphical user interface.

BACKGROUND ART

User interface panels include various user interface objects as well as content, which can be manipulated by the user. Common to any user interface is a panel area for displaying content (e.g., text, graphics, and/or the like). The panel area can be manipulated indirectly, e.g., by using a related user interface control, such as a scroll bar, to affect the content displayed in the panel area. Alternatively, the panel area can be manipulated directly, e.g., by interacting with the panel area itself, such as using finger motion on a track pad, a touch screen, or the like. While user interfaces include standard user interface widgets, the manner in which a widget is manipulated using an indirect or direct manipulation approach can be inconsistent. For example, a user frequently is required to scroll a panel area to view a portion of content. Using indirect manipulation, the user can move a scroll box of a scroll bar. When the scroll box is moved down, the content in the panel scrolls up and the user can see the content previously below the lower boundary of the panel area. However, using direct manipulation, the user holds the content currently displayed and moves the content up, thereby revealing the content that is currently below the lower boundary of the panel area. As a result, the user performs opposite movements based on which manipulation technique is employed.

SUMMARY OF THE INVENTION

A first aspect of the invention provides a computer-implemented method of managing a graphical user interface, the method including: generating content included in the graphical user interface for presentation to a user, where the graphical user interface includes a panel area having a set of display settings, and where the generating includes: a computer system determining the content to be displayed using the panel area cannot be displayed completely within the panel area having the set of display settings; in response to the determining, the computer system adding data corresponding to a visible portion of the content for display in the panel area; and in response to the determining, the computer system displaying a graphical user interface scroll control in the graphical user interface, the graphical user interface scroll control comprising a pulley mechanism having a load side and a pull side, and wherein the graphical user interface scroll control is visually distinct from the panel area and enables the user to adjust the visible portion of the content in a first direction by manipulating the load side or the pull side of the pulley mechanism in the first direction.

A second aspect of the invention provides a computer system including: a set of computing devices for managing a graphical user interface by performing a method including: generating content included in the graphical user interface for presentation to a user, where the graphical user interface includes a panel area having a set of display settings, and where the generating includes: determining the content to be displayed using the panel area cannot be displayed completely within the panel area having the set of display settings; in response to the determining, adding data corresponding to a visible portion of the content for display in the panel area; and in response to the determining, displaying a graphical user interface scroll control in the graphical user interface, the graphical user interface scroll control comprising a pulley mechanism having a load side and a pull side, and wherein the graphical user interface scroll control is visually distinct from the panel area and enables the user to adjust the visible portion of the content in a first direction by manipulating the load side or the pull side of the pulley mechanism in the first direction.

A third aspect of the invention provides a computer program product including program code embodied in at least one computer-readable medium, which when executed, enables a computer system to implement a method of managing a graphical user interface, the method including: generating content included in the graphical user interface for presentation to a user, where the graphical user interface includes a panel area having a set of display settings, and where the generating includes: determining the content to be displayed using the panel area cannot be displayed completely within the panel area having the set of display settings; in response to the determining, adding data corresponding to a visible portion of the content for display in the panel area; and in response to the determining, displaying a graphical user interface scroll control in the graphical user interface, the graphical user interface scroll control comprising a pulley mechanism having a load side and a pull side, and wherein the graphical user interface scroll control is visually distinct from the panel area and enables the user to adjust the visible portion of the content in a first direction by manipulating the load side or the pull side of the pulley mechanism in the first direction.

A fourth aspect of the invention provides a method including: providing a computer system for managing a graphical user interface by performing a method including: generating content included in the graphical user interface for presentation to a user, where the graphical user interface includes a panel area having a set of display settings, and where the generating includes: determining the content to be displayed using the panel area cannot be displayed completely within the panel area having the set of display settings; in response to the determining, adding data corresponding to a visible portion of the content for display in the panel area; and in response to the determining, displaying a graphical user interface scroll control in the graphical user interface, the graphical user interface scroll control comprising a pulley mechanism having a load side and a pull side, and wherein the graphical user interface scroll control is visually distinct from the panel area and enables the user to adjust the visible portion of the content in a first direction by manipulating the load side or the pull side of the pulley mechanism in the first direction.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 1 shows an illustrative environment for managing a graphical user interface according to an embodiment.

FIG. 2 shows an illustrative method of managing the panel area of a graphical user interface according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 3A:
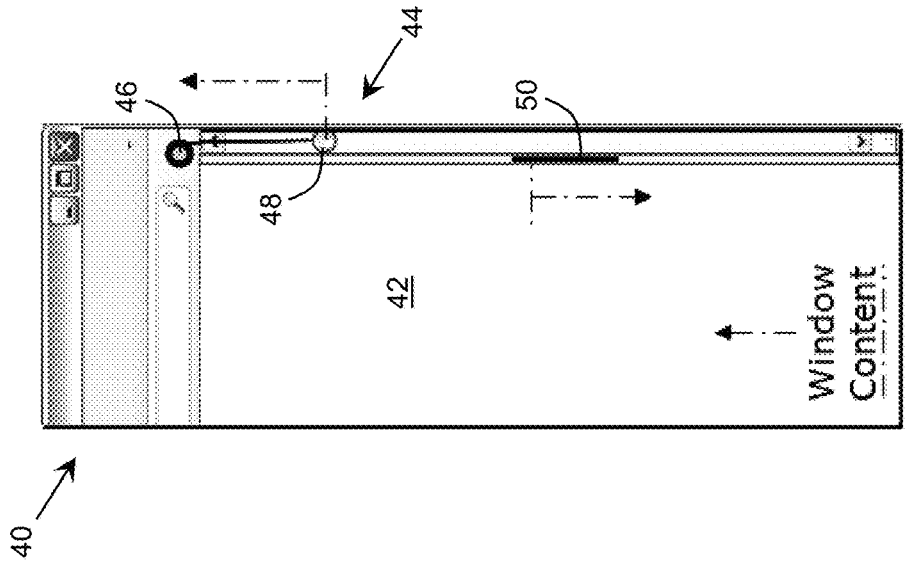
FIGS. 3A and 3B show an illustrative graphical user interface scroll control for enabling a user to adjust the portion of the content displayed in a panel area according to an embodiment.

The inventors have discovered that the different manners in which scrolling is performed using direct or indirect manipulation can present a problem for users. Such a problem can be compounded when the user can select whether to use direct or indirect manipulation on the same device.

To this extent, aspects of the invention provide a solution for managing a graphical user interface including a panel area. Content included in the graphical user interface can be generated for presentation to a user. The generating can include determining the content to be displayed using the panel area cannot be displayed completely within the panel area using a set of display settings. In response, data corresponding to a visible portion of the content can be added for display in the panel area and a graphical user interface scroll control can be provided for the panel area. The graphical user interface scroll control can enable a user to adjust the portion of the content displayed in the panel area in a first direction by manipulating the graphical user interface scroll control in the first direction. As a result, a user can perform the same motion for scrolling regardless of the type of pointing device (e.g., a mouse, touch pad, and/or the like) and/or scrolling solution (e.g., manipulating a user interface control associated with a panel area or manipulating the panel area directly) utilized. In an embodiment, the graphical user interface scroll control uses a pulley analogy to enable the user to scroll the content in the same direction as a locator mechanism of the pulley is moved. As used herein, unless otherwise noted, the term "set" means one or more (i.e., at least one) and the phrase "any solution" means any now known or later developed solution.

Turning to the drawings, FIG. 1 shows an illustrative environment 10 for managing a graphical user interface 40 according to an embodiment. To this extent, the environment 10 includes a computer system 20 that can perform a process described herein in order to manage the graphical user interface 40. In particular, the computer system 20 is shown including a presentation program 30, which makes the computer system 20 operable to manage the graphical user interface 40 by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the presentation program 30, which is at least partially fixed in the storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can include one or more human I/O devices, which enable a human user 12 to interact with the computer system 20 and/or one or more communications devices to enable a system user 12 to communicate with the computer system 20 using any type of communications link. To this extent, the presentation program 30 can manage a set of interfaces (e.g., graphical user interface(s) 40, application program interface, and/or the like) that enable human and/or system users 12 to interact with the presentation program 30. Furthermore, the presentation program 30 can manage (e.g., store, retrieve, create, manipulate, organize, present, etc.) the data, such as the presentation data 34, using any solution.

In any event, the computer system 20 can include one or more general purpose computing articles of manufacture (e.g., computing devices) capable of executing program code, such as the presentation program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the presentation program 30 can be embodied as any combination of system software and/or application software.

Furthermore, the presentation program 30 can be implemented using a set of modules 32. In this case, a module 32 can enable the computer system 20 to perform a set of tasks used by the presentation program 30, and can be separately developed and/or implemented apart from other portions of the presentation program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 includes multiple computing devices, each computing device can have only a portion of the presentation program 30 fixed thereon (e.g., one or more modules 32). However, it is understood that the computer system 20 and the presentation program 30 are only representative of various possible equivalent computer systems that may perform a process described herein. To this extent, in other embodiments, the functionality provided by the computer system 20 and the presentation program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems using any type of communications link. In either case, the communications link can include any combination of various types of optical fiber, wired, and/or wireless links; include any combination of one or more types of networks; and/or utilize any combination of various types of transmission techniques and protocols.

As discussed herein, the presentation program 30 enables the computer system 20 to manage the graphical user interface 40. To this extent, the computer system 20 can generate the graphical user interface 40 for presentation to a user 12. The computer system 20 display the graphical user interface 40 directly to the user 12, or communicate the graphical user interface 40 for display to a user on another computing device.

In any event, the computer system 20 can generate the graphical user interface 40 to enable the user 12 to manage any type of data, such as application data, which can be stored as presentation data 34. For example, the graphical user interface 40 can display some or all of the presentation data 34 to the user 12, enable the user 12 to modify some or all of the presentation data 34, enable the user 12 to create new presentation data 34, and/or the like. However, it is understood that the graphical user interface 40 can only provide the presentation data 34 for display to the user 12, and not enable the user 12 to modify any of the presentation data 34. Regardless, based on one or more actions by the user 12 (e.g., change in settings, modification to content, selection of a control, and/or the like), the computer system 20 can update the graphical user interface 40. As part of generating and/or updating the graphical user interface 40, the computer system 20 can generate content included in the graphical user interface 40 based on the attributes of the graphical user interface and the various user interface controls defined therein.

To this extent, the graphical user interface 40 can include one or more panel areas, each of which is located in an area of the graphical user interface 40. Each panel area enables the display (and can enable modification, addition, deletion, and/or the like) of at least a portion of the presentation data 34 within the graphical user interface 40. To this extent, a panel area can be a rendering of a page of a document, a portion of a graphical user interface control that enables a user to view and/or edit text, images, and/or the like. The panel area can include a set of display settings, which can be stored as presentation data 34. The display settings can define the area of the graphical user interface 40 within which the panel area is displayed. To this extent, one or more of the set of display settings can automatically change based on a change to one or more attributes of the graphical user interface 40 (e.g., a resize of a window). Furthermore, the set of display settings can define one or more attributes of how the content is presented within the panel area. For example, the attributes can include a size (e.g., zoom, font size, and/or the like) of the content, a color, and/or the like.

FIG. 2 shows an illustrative method of managing the panel area of a graphical user interface according to an embodiment, which can be implemented by the computer system 20 as part of a method of managing the graphical user interface 40. While an illustrative series of actions are shown, it is understood that the computer system 20 can implement any variation of the actions to manage the panel area of a graphical user interface. Regardless, referring to FIGS. 1 and 2, when generating the graphical user interface 40, in action 102, the computer system 20 can acquire the content for display in a panel area included in the graphical user interface 40 from the presentation data 34 using any solution.

Additionally, the computer system 20 can generate and add data corresponding to at least a portion of the content for display in the panel area using the set of display settings for the panel area. To this extent, in action 104, the computer system 20 can determine whether the content to be displayed using the set of display settings within the panel area can or cannot be displayed completely within the panel area. In response to determining the content can be completely displayed, in action 106, the computer system 20 can generate and add data corresponding to the content for display in the panel area. Additionally, in action 108, the computer system 20 can remove a scroll control for the panel area, if necessary. Removing the graphical user interface scroll control can include removing a displayed control from the graphical user interface, deactivating a displayed and currently active control, and/or the like.

In response to determining the content cannot be completely displayed, in action 110, the computer system 20 can generate and add data corresponding to a visible portion of the content for display in the panel area. Additionally, in action 112, the computer system 20 can provide a graphical user interface scroll control in the graphical user interface 40, which is distinct from the panel area and enables the user 12 to adjust the portion of the content displayed in the panel area. Providing the graphical user interface scroll control can include displaying the control within the graphical user interface, activating an already displayed control for use by the user, and/or the like.

In either case, in action 114, the computer system 20 can receive a user interaction event corresponding to the panel area. In general, the user interaction event can be a scroll event, a change to the content, or an adjustment of one or more display settings of the panel area. To this extent, in action 116, the computer system 20 can determine whether the user interaction event is a scroll event. If so, in action 118, the computer system 20 can adjust the visible portion of the content in the panel area and return to action 114 until another user interaction event is received. Otherwise, in action 120, the computer system 20 can determine whether the user interaction event changed the content. If so, action 122, the computer system 20 can update the content based on the change and return to action 104, where the computer system 20 determines whether the revised content is completely displayable. Otherwise, in action 124, the computer system 124 can adjust one or more of the display settings of the panel area based on the user interaction event and return to action 104 to determine whether the content is completely displayable in the panel area with the revised display setting(s). The computer system 20 can continue managing the panel area until the graphical user interface is closed by the user.

In an embodiment, the graphical user interface scroll control enables the user 12 to perform a motion for scrolling content displayed in a panel area in the same direction using either the graphical user interface scroll control or by directly manipulating the panel area. To this extent, the graphical user interface scroll control can enable the user 12 to adjust the portion of the content displayed in the panel area by manipulating the graphical user interface scroll control in the same desired direction as the adjustment. For example, in order to scroll content up to view content lower than a lower boundary of the panel area, the user 12 can operate the graphical user interface scroll control in an upward direction. Conversely, in order to scroll content down to view content higher than an upper boundary of the panel area, the user can operate the graphical user interface scroll control in a downward direction. While aspects of the invention are illustrated and described using vertically oriented graphical user interface scroll controls, it is understood that aspects of the invention can be directed to adjusting the portion of the content displayed in the panel area in any direction, including horizontally.

Figure 3B:
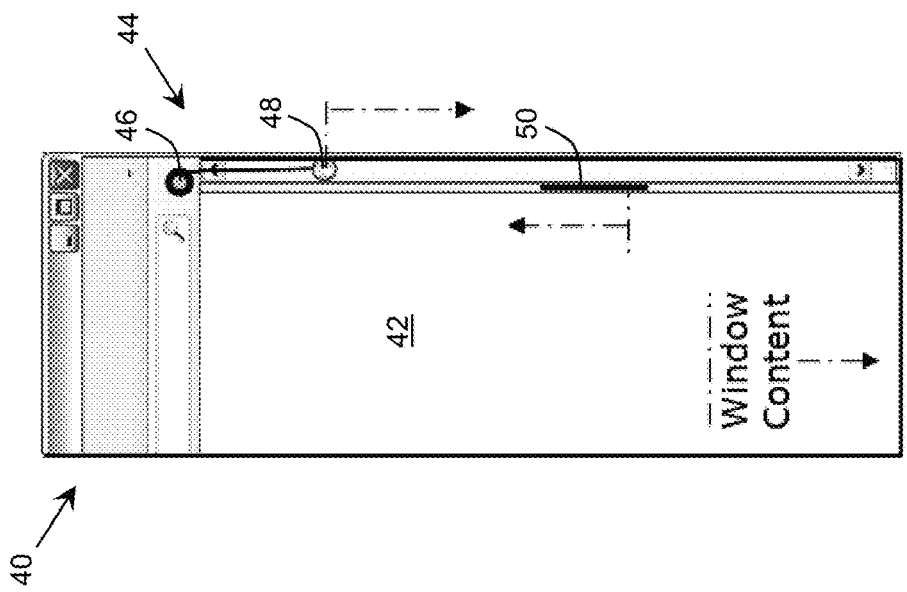

FIGS. 3A and 3B show an illustrative graphical user interface scroll control 44 for enabling a user 12 (FIG. 1) to adjust the portion of the content displayed in a panel area 42 according to an embodiment. As illustrated, a graphical user interface 40 includes a panel area 42, which cannot display all of the content within the panel area using the current set of display settings for the panel area 42, e.g., due to an amount of the content being too large. As a result, a visible portion of the content scrolls off the panel area, beyond one or more of the boundaries of the panel area. To this extent, the graphical user interface 40 includes a graphical user interface scroll control 44, which is visually distinct from the panel area 42 (e.g., located in another portion of the graphical user interface 40, such as on a side of the panel area 42) and enables the user 12 to adjust the portion of the content displayed in the panel area 42.

The graphical user interface scroll control 44 is shown including a pulley mechanism 46 having a load side and a pull side opposite the load side. The pulley mechanism 46 is located with respect to the panel area 42 such that the load side of the pulley mechanism 46 is graphically associated (e.g., based on relative locations, a visual cue such as a "rope," and/or the like) with the panel area 42. The graphical user interface scroll control 44 also includes a locator mechanism 48 graphically associated with the pull side of the pulley mechanism 46. The user 12 can operate the locator mechanism 48 of the graphical user interface scroll control 44 to move the portion of the data displayed in the panel area 42 in a desired direction. For example, as shown in FIG. 3A, by moving the locator mechanism 48 in a downward direction, the portion of the data displayed in the panel area 42 also moves in a downward direction. Similarly, as shown in FIG. 3B, by moving the locator mechanism 48 in an upward direction, the portion of the data displayed in the panel area 42 also moves in an upward direction.

As discussed herein, the graphical user interface scroll control 44 can be used to replace a scroll bar typically used in the prior art. However, a user 12 (FIG. 1), can be used to the visual cue provided by the scroll bar as to where the currently visible portion of the data is located with respect to all of the data, which can be displayed in the panel area 42. To this extent, the graphical user interface scroll control 44 also can include a scroll location indicator 50, which is graphically associated with the load side of the pulley mechanism 46. The scroll location indicator 50 can move in an opposite direction as the locator mechanism 48 to provide an indication of a location of the currently visible portion of the data displayed in the panel area 42 with respect to all of the data.

Figure 4A:
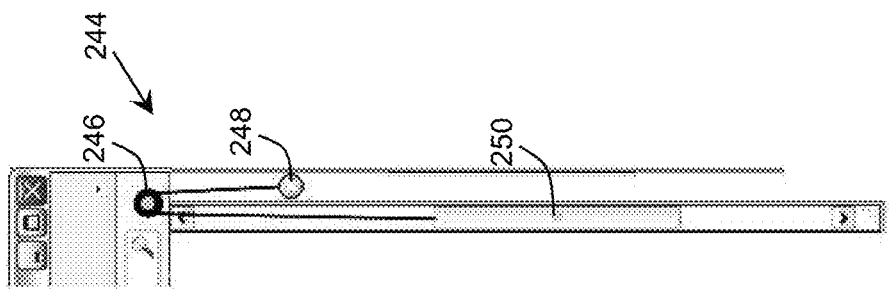
FIGS. 4A and 4B show illustrative graphical user interface scroll controls for enabling a user to adjust a portion of content displayed in a panel area according to embodiments.
Figure 4B:
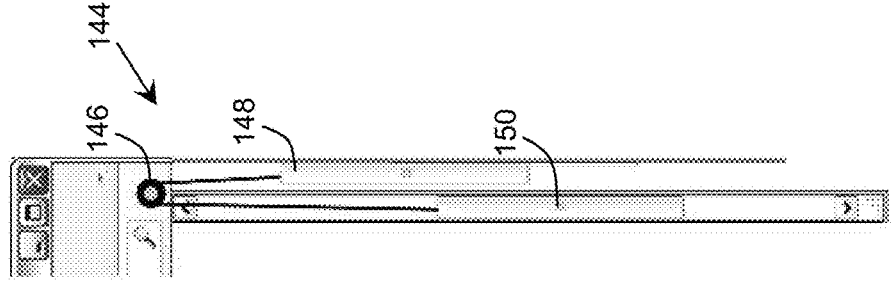

It is understood that the graphical user interface scroll control 44 is only illustrative of various types of graphical user interface scroll controls 44, which can be utilized to adjust the location of the visible portion of data in a panel area 42. To this extent, FIGS. 4A and 4B show illustrative graphical user interface scroll controls 144, 244, respectively, for enabling a user to adjust a portion of content displayed in a panel area according to embodiments. In FIG. 4A, the graphical user interface scroll control 144 includes a pulley mechanism 146, which is graphically associated with a pair of locator mechanisms 148, 150 on opposing sides of the pulley mechanism 146. The graphical user interface scroll control 244 of FIG. 4B is configured similarly, however, the locator mechanism 248 graphically associated with the pull side of the pulley mechanism 246 has a different appearance than the locator mechanism 250 graphically associated with the load side of the pulley mechanism 246. Furthermore, while various embodiments of a pulley mechanism are shown, it is understood that other graphical metaphors can be utilized. For example, the graphical user interface scroll control could have an appearance designed to mimic a rope looped over a nail, a block and tackle device, a seesaw, a balance scale, and/or the like.

In either case, a user 12 (FIG. 1) can operate the locator mechanism 148, 248 graphically associated with the pull side of the pulley mechanism 146, 246 to adjust the portion of the data displayed in a corresponding display area 42 (FIGS. 3A, 3B) as described in conjunction with the locator mechanism 48 (FIGS. 3A, 3B). However, the user 12 also can operate the locator mechanism 150, 250 graphically associated with the load side of the pulley mechanism 146, 246 to adjust the portion of the data displayed in the corresponding display area 42 in a manner similar to a scroll bar. As a result, the graphical user interface scroll control 144 enables the user 12 to select the manner in which the portion of the content displayed in the display area 42 is adjusted. For both graphical user interface scroll controls 144, 244, when a user 12 selects and operates one of the corresponding locator mechanisms, the other locator mechanism can move in an opposite direction based on the portion of the data being displayed within the display area.

Figure 5A:
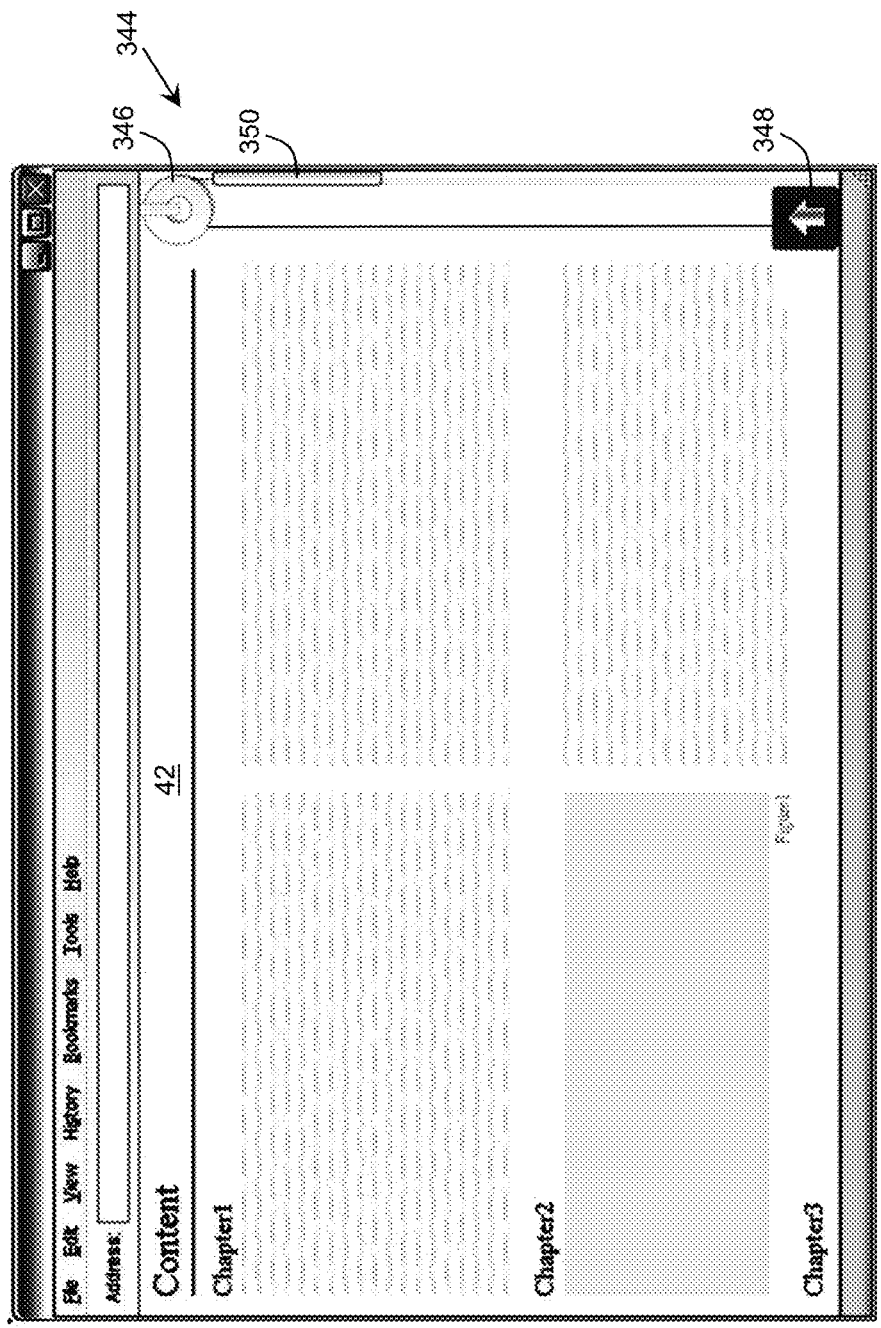
FIGS. 5A-5C show another illustrative graphical user interface scroll control according to another embodiment.
Figure 5B:
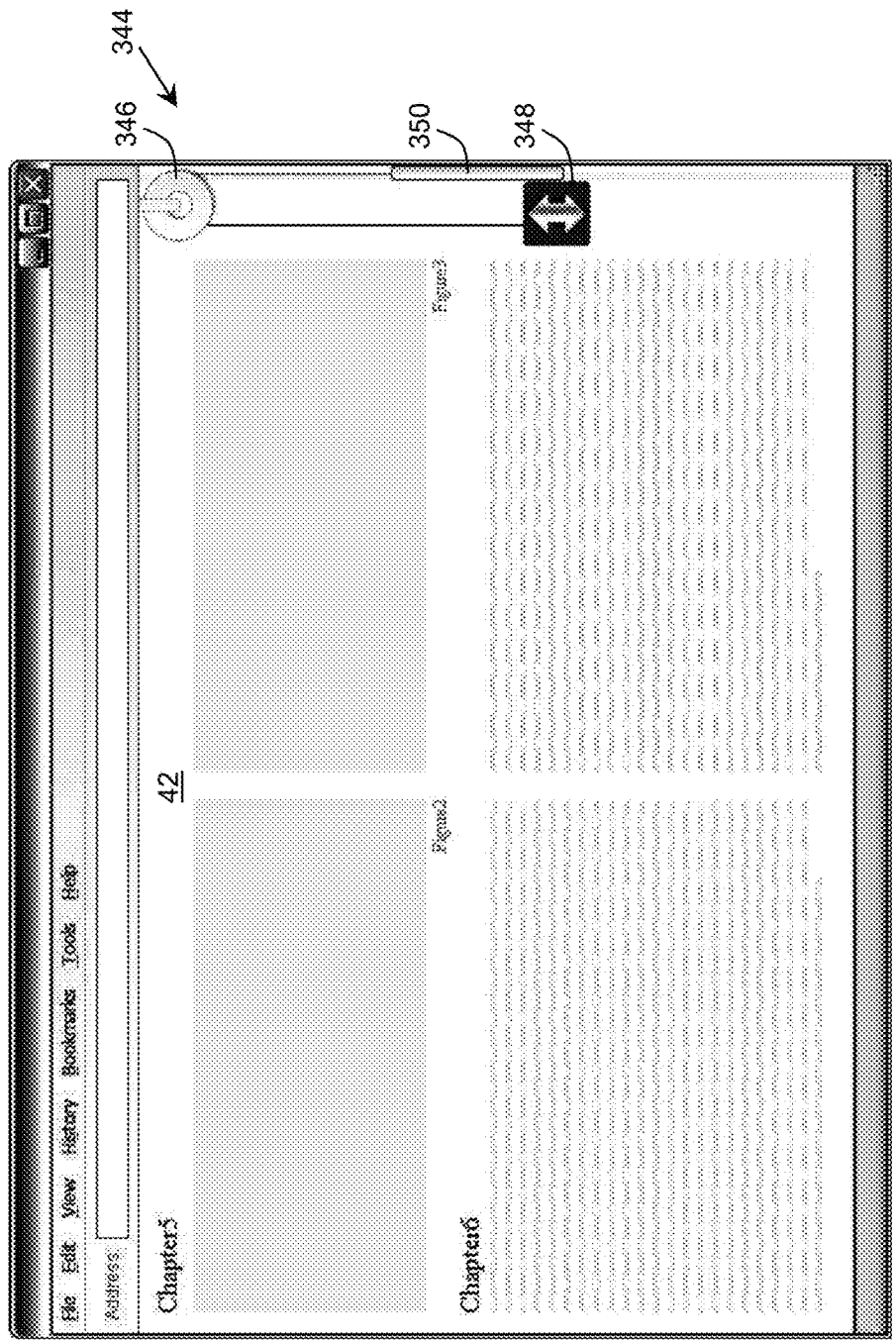
Figure 5C:
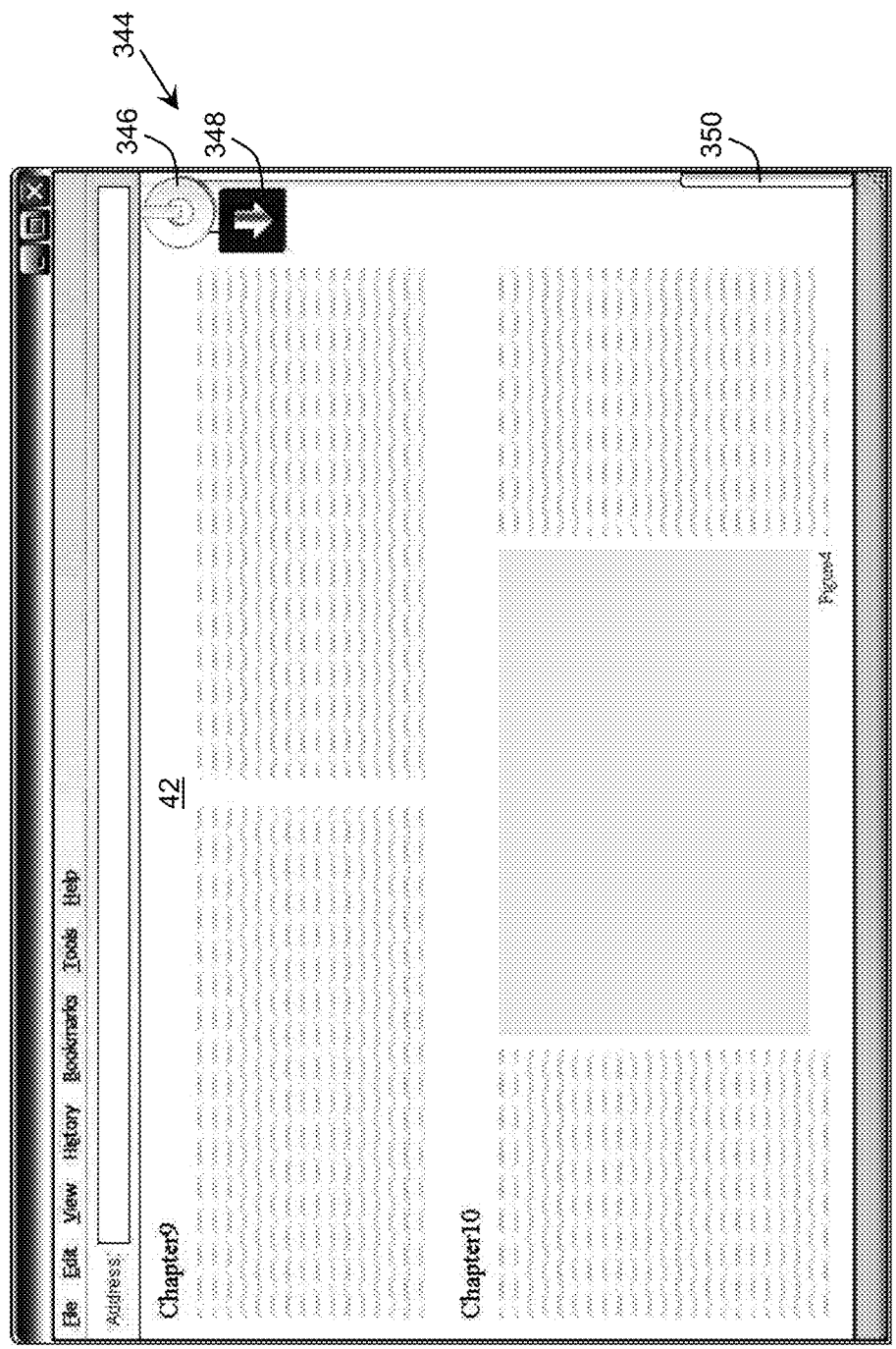

It is understood that various alternative configurations of the graphical user interface scroll control described herein can be utilized. For example, FIGS. 5A-5C show another illustrative graphical user interface scroll control 344 according to another embodiment. In this case, the panel area 42 is graphically associated with a pull side of the pulley mechanism 346. Furthermore, a graphical indicator for the locator mechanism 348 can change based on the portion of the content being displayed in the panel area 42. In particular, as shown in FIG. 5A, the locator mechanism 348 can include an arrow indicating that the data displayed in the panel area 42 can only be scrolled up to reveal content below the data currently displayed. Similarly, as shown in FIG. 5C, the locator mechanism 348 can include an arrow indicating that the data displayed in the panel area 42 can only be scrolled down to reveal content above the data currently displayed. For other intermediate positions, as shown in FIG. 5B, the locator mechanism 348 can include a two sided arrow indicating that the content can be scrolled in either direction. Furthermore, the graphical user interface scroll control 344 can include a scroll location indicator 350 graphically associated with a load side of the pulley mechanism 346, which can indicate the relative location of the data currently being displayed in the panel area 42 in a manner similar to a scroll bar. The scroll location indicator 350 can be for display only or also can be manipulated by the user 12 in order to adjust the portion of the data being displayed in the panel area 42.

While each of the illustrative graphical user interface devices shown herein includes a scroll location indicator, it is understood that an embodiment of the graphical user interface device can be implemented without the scroll location indicator. Furthermore, while not shown, it is understood that the pulley mechanism can be configured to appear to turn in a direction corresponding to manipulation of a locator mechanism by a user. Still further, an embodiment can enable the user to perform scrolling by interacting with the pulley mechanism itself, e.g., by hovering over a pull side or load side of the pulley, and/or the like.

While shown and described herein as a method and system for managing a graphical user interface, it is understood that aspects of the invention further provide various alternative embodiments. For example, in one embodiment, the invention provides a computer program fixed in at least one computer-readable medium, which when executed, enables a computer system to manage the graphical user interface. To this extent, the computer-readable medium includes program code, such as the presentation program 30 (FIG. 1), which enables a computer system to implement some or all of a process described herein. It is understood that the term "computer-readable medium" includes one or more of any type of tangible medium of expression, now known or later developed, from which a copy of the program code can be perceived, reproduced, or otherwise communicated by a computing device. For example, the computer-readable medium can include: one or more portable storage articles of manufacture; one or more memory/storage components of a computing device; paper; and/or the like.

Another embodiment of the invention provides a method of providing a copy of program code, such as the presentation program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

Still another embodiment of the invention provides a method of generating a system for managing a graphical user interface. In this case, a computer system, such as the computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can include one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of managing a graphical user interface, the method comprising:
generating content included in the graphical user interface for presentation to a user, wherein the graphical user interface comprises a panel area having a set of display settings, and wherein the generating comprises:
a computer system determining the content to be displayed using the panel area cannot be displayed completely within the panel area having the set of display settings;
in response to the determining, the computer system adding data corresponding to a visible portion of the content for display in the panel area; and
in response to the determining, the computer system displaying a graphical user interface scroll control in the graphical user interface, the graphical user interface scroll control comprising a pulley mechanism having a pulley wheel and a pulley rope extending over the pulley wheel, the pulley rope including a load side rope portion and a pull side rope portion, wherein the pulley wheel and pulley rope are all displayed, and wherein the graphical user interface scroll control is visually distinct from the panel area and enables the user to adjust the visible portion of the content in a first direction by manipulating the load side rope portion or the pull side rope portion of the pulley mechanism in the first direction.

2. The method of claim 1, wherein the graphical user interface scroll control further comprises:
a locator mechanism graphically associated with the pull side rope portion of the pulley mechanism, wherein the user moves the locator mechanism in the first direction to move the location of the visible portion of the content in the first direction.

3. The method of claim 2, wherein the generating further comprises:
the computer system receiving scroll data corresponding to movement of the locator mechanism by the user in a first direction; and
the computer system adjusting the visible portion of the content in response to the scroll data.

4. The method of claim 2, wherein the graphical user interface scroll control further comprises a scroll location indicator graphically associated with the load side rope portion of the pulley mechanism, wherein the scroll location indicator moves in an opposite direction of the locator mechanism during operation of the graphical user interface scroll control.

5. The method of claim 4, wherein the user can adjust the visible portion of the content using either the locator mechanism or the scroll location indicator of the graphical user interface scroll control.

6. The method of claim 1, wherein the generating further comprises:
the computer system receiving data corresponding to one of: an adjustment of at least one of the set of display settings or a change to the content; and
the computer system adjusting a set of attributes of the graphical user interface scroll control in response to the adjustment.

7. The method of claim 6, wherein the adjusting comprises:

the computer system determining the content can be completely shown in the panel area; and in response to the determining the content can be completely shown in the panel area, the computer system removing the graphical user interface scroll control.

8. A computer system comprising:
a set of computing devices, each computing device including a processor, for managing a graphical user interface by performing a method comprising:
  generating content included in the graphical user interface for presentation to a user, wherein the graphical user interface comprises a panel area having a set of display settings, and wherein the generating comprises:
    determining the content to be displayed using the panel area cannot be displayed completely within the panel area having the set of display settings;
    in response to the determining, adding data corresponding to a visible portion of the content for display in the panel area; and
    in response to the determining, displaying a graphical user interface scroll control in the graphical user interface, the graphical user interface scroll control comprising a pulley mechanism having a pulley wheel and a pulley rope extending over the pulley wheel, the pulley rope including a load side rope portion and a pull side rope portion, wherein the pulley wheel and pulley rope are all displayed, and wherein the graphical user interface scroll control is visually distinct from the panel area and enables the user to adjust the visible portion of the content in a first direction by manipulating the load side rope portion or the pull side rope portion of the pulley mechanism in the first direction.

9. The system of claim 8, wherein the graphical user interface scroll control further comprises:
a locator mechanism graphically associated with the pull side rope portion of the pulley mechanism, wherein the user moves the locator mechanism in the first direction to move the location of the visible portion of the content in the first direction.

10. The system of claim 9, wherein the generating further comprises:
receiving scroll data corresponding to movement of the locator mechanism by the user in a first direction; and
adjusting the visible portion of the content in response to the scroll data.

11. The system of claim 9, wherein the graphical user interface scroll control further comprises a scroll location indicator graphically associated with the load side rope portion of the pulley mechanism, wherein the scroll location indicator moves in an opposite direction of the locator mechanism during operation of the graphical user interface scroll control.

12. The system of claim 8, wherein the generating further comprises:
receiving data corresponding to one of: an adjustment of at least one of the set of display settings or a change to the content; and
adjusting a set of attributes of the graphical user interface scroll control in response to the adjustment.

13. The system of claim 12, wherein the adjusting comprises:
determining the content can be completely shown in the panel area; and in response to the determining the content can be completely shown in the panel area, removing the graphical user interface scroll control.

14. A computer program product comprising program code embodied in at least one non-transitory computer-readable medium, which when executed, enables a computer system to implement a method of managing a graphical user interface, the method comprising:
generating content included in the graphical user interface for presentation to a user, wherein the graphical user interface comprises a panel area having a set of display settings, and wherein the generating comprises:
  determining the content to be displayed using the panel area cannot be displayed completely within the panel area having the set of display settings;
  in response to the determining, adding data corresponding to a visible portion of the content for display in the panel area; and
  displaying a graphical user interface scroll control in the graphical user interface, the graphical user interface scroll control comprising a pulley mechanism having a pulley wheel and a pulley rope extending over the pulley wheel, the pulley rope including a load side rope portion and a pull side rope portion, wherein the pulley wheel and pulley rope are all displayed, and wherein the graphical user interface scroll control is visually distinct from the panel area and enables the user to adjust the visible portion of the content in a first direction by manipulating the load side rope portion or the pull side rope portion of the pulley mechanism in the first direction.

15. The program product of claim 14, wherein the graphical user interface scroll control further comprises:
a locator mechanism graphically associated with the pull side rope portion of the pulley mechanism, wherein the user moves the locator mechanism in the first direction to move the location of the visible portion of the content in the first direction.

16. The program product of claim 15, wherein the generating further comprises:
receiving scroll data corresponding to movement of the locator mechanism by the user in a first direction; and
adjusting the visible portion of the content in response to the scroll data.

17. The program product of claim 15, wherein the graphical user interface scroll control further comprises a scroll location indicator graphically associated with the load side rope portion of the pulley mechanism, wherein the scroll location indicator moves in an opposite direction of the locator mechanism during operation of the graphical user interface scroll control.

18. The program product of claim 17, wherein the user can adjust the visible portion of the content using either the locator mechanism or the scroll location indicator of the graphical user interface scroll control.

19. The program product of claim 14, wherein the generating further comprises:
receiving data corresponding to one of: an adjustment of at least one of the set of display settings or a change to the content; and
adjusting a set of attributes of the graphical user interface scroll control in response to the adjustment.

20. The program product of claim 19, wherein the adjusting comprises:
determining the content can be completely shown in the panel area; and in response to the determining the content can be completely shown within the panel area, removing the graphical user interface scroll control.

\* \* \* \* \*